(12) United States Patent
Jeong et al.

(10) Patent No.: US 10,135,516 B2
(45) Date of Patent: Nov. 20, 2018

(54) METHOD AND DEVICE FOR OPERATING BEAM MODE IN WIRELESS COMMUNICATION SYSTEM

(71) Applicant: Samsung Electronics Co., Ltd., Gyeonggi-do (KR)

(72) Inventors: Cheol Jeong, Gyeonggi-do (KR); Hyunkyu Yu, Gyeonggi-do (KR); Jeongho Park, Seoul (KR); Jaewon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/037,317

(22) PCT Filed: Dec. 26, 2014

(86) PCT No.: PCT/KR2014/012918
§ 371 (c)(1),
(2) Date: May 17, 2016

(87) PCT Pub. No.: WO2015/099497
PCT Pub. Date: Jul. 2, 2015

(65) Prior Publication Data
US 2016/0294462 A1    Oct. 6, 2016

(30) Foreign Application Priority Data
Dec. 27, 2013    (KR) .................. 10-2013-0165162

(51) Int. Cl.
*H04B 7/00*    (2006.01)
*H04B 7/06*    (2006.01)
(Continued)

(52) U.S. Cl.
CPC ........... *H04B 7/0695* (2013.01); *H04B 7/063* (2013.01); *H04B 10/25752* (2013.01);
(Continued)

(58) Field of Classification Search
CPC ...... H04B 7/0695; H04B 7/063; H04B 10/29; H04L 25/0202; H04W 72/046; H04W 88/08
(Continued)

(56) References Cited

U.S. PATENT DOCUMENTS 9,237,475 B2 *  1/2016  Josiam ................. H04W 24/10
2005/0047347 A1 *  3/2005  Lee ........................... H04L 1/20
370/241
(Continued)

FOREIGN PATENT DOCUMENTS

KR    10-2009-0018518    2/2009
KR    10-2014-0016854    2/2014
(Continued)

OTHER PUBLICATIONS

International Search Report dated Mar. 24, 2015 in connection with International Patent Application No. PCT/KR2014/012918, 5 pages.
(Continued)

*Primary Examiner* — Md Talukder (57) ABSTRACT

According to one embodiment of the present invention, provided is a method for setting a beam mode of a base station in a wireless communication system, comprising the steps of: selecting the beam mode for at least one terminal, which is serviced by the base station, on the basis of a channel state of a transmission beam or a reception beam of the base station; transmitting, to the terminal, a control message including selected beam mode information; and performing data communication with the terminal by using the transmission beam and the reception beam corresponding to the selected mode. In addition, according to one embodiment of the present invention, provided is a communication method of the terminal in the wireless communication system, comprising the steps of: receiving a beam mode setting message from the base station; setting either a
(Continued)

beam fixation mode or a beam sweeping mode on the basis of the received beam mode setting message; and performing data communication with the base station on the basis of the set mode.

20 Claims, 9 Drawing Sheets

(51) Int. Cl.
    *H04B 10/29* (2013.01)
    *H04L 25/02* (2006.01)
    *H04W 72/04* (2009.01)
    *H04W 88/08* (2009.01)
    *H04B 10/2575* (2013.01)
    *H04W 72/08* (2009.01)

(52) U.S. Cl.
    CPC ......... *H04B 10/29* (2013.01); *H04L 25/0202* (2013.01); *H04W 72/046* (2013.01); *H04W 88/08* (2013.01); *H04W 72/085* (2013.01)

(58) Field of Classification Search
    USPC .......................................... 455/509
    See application file for complete search history.

(56) References Cited

U.S. PATENT DOCUMENTS

| | | | |
|---|---|---|---|
| 2006/0025178 A1* | 2/2006 | Tao | H04B 7/0617 455/562.1 |
| 2006/0286974 A1* | 12/2006 | Gore | H04W 16/00 455/422.1 |
| 2008/0161056 A1* | 7/2008 | Hovers | H04B 7/0695 455/562.1 |
| 2009/0046594 A1* | 2/2009 | Zhou | H04B 7/0452 370/252 |
| 2010/0172931 A1 | 5/2010 | Rensburg et al. | |
| 2012/0182895 A1 | 7/2012 | Jwa | |
| 2013/0045690 A1* | 2/2013 | Seol | H04B 7/0417 455/63.4 |
| 2013/0235754 A1* | 9/2013 | Lim | H04W 72/042 370/252 |
| 2015/0010105 A1 | 1/2015 | Kim et al. | |
| 2015/0358064 A1* | 12/2015 | Benjebbour | H04B 7/0452 370/329 |
| 2016/0006122 A1 | 1/2016 | Seol et al. | |
| 2016/0119910 A1* | 4/2016 | Krzymien | H04B 7/0639 370/329 |
| 2016/0294462 A1* | 10/2016 | Jeong | H04B 7/063 |

FOREIGN PATENT DOCUMENTS

WO    WO 2006/138581 A2    12/2006
WO    WO 2013/089525 A1    6/2013

OTHER PUBLICATIONS

Written Opinion of the International Searching Authority dated Mar. 24, 2015 in connection with International Patent Application No. PCT/KR2014/012918, 6 pages.

* cited by examiner

FIG. 9

METHOD AND DEVICE FOR OPERATING BEAM MODE IN WIRELESS COMMUNICATION SYSTEM

TECHNICAL FIELD

The present invention relates to a method and device for operating a beam mode in a wireless communication system.

BACKGROUND ART

As one of techniques to increase communication capacity in the next-generation communication, a broadband in a super high frequency region may be used for data transmission and reception. However, since the super high frequency region has a great path loss, it is required to improve a beamforming gain by using a plurality of antennas at a terminal and a base station. In this case, since a beam has directivity, the base station and the terminal adjust a beam in a specific direction for communication.

Currently in the cellular network using a frequency region of 5 GHz or less, there is a radio shadow area where a signal of the base station fails to arrive. In order to solve this, a repeater is installed in the radio shadow area. Such a repeater amplifies the signal received from the base station and retransmits it to the terminal. In the 30 GHz millimeter wave (mmWave) region, the repeater is needed essentially because a propagation distance of the signal transmitted from the base station becomes shorter due to a great path loss.

In order to provide a service to users located in a building, an optical repeater may be installed. The base station and the optical repeater are connected by an optical cable. The optical repeater amplifies a signal received from the base station and then sends it to the users in the building. The optical repeater does not perform a beam sweeping. Namely, when the base station sends a signal through each beam, the optical repeater resends the signal by using one or more fixed beams.

In this environment, a channel status between the optical repeater and the terminal does not vary according to beams of the base station. Namely, the channel status is nearly unvaried in case of all beams operated by the base station. Therefore, required is a system operation method optimized for the terminal in such environments.

DISCLOSURE OF INVENTION

Technical Problem

The present invention is to provide an optimized system operation method. Embodiments of the present invention provide optimized system operation methods through an adaptive beam mode operation.

Solution to Problem

According to an embodiment of this invention, provided is a method for setting a beam mode at a base station in a wireless communication system, comprising steps of selecting a beam mode for at least one terminal serviced by the base station, based on a channel status of a transmission beam or a reception beam of the base station; transmitting a control message containing information about the selected beam mode to the terminal; and performing data communication with the terminal by using a transmission beam and a reception beam corresponding to the selected mode.

Additionally, according to an embodiment of this invention, provided is a method at a device in a wireless communication system, comprising steps of receiving a beam mode setting message from a base station; setting one of a beam fixed mode or a beam sweeping mode, based on the received beam mode setting message; and performing data communication with the base station, based on the set mode.

Additionally, according to an embodiment of this invention, provided is a base station for setting a beam mode in a wireless communication system, comprising a transceiver unit configured to perform data communication with at least one network node; and a mode selection controller configured to control selecting a beam mode for at least one terminal serviced by the base station, based on a channel status of a transmission beam or a reception beam of the base station, to control transmitting a control message containing information about the selected beam mode to the terminal, and to control performing data communication with the terminal by using a transmission beam and a reception beam corresponding to the selected mode.

Additionally, according to an embodiment of this invention, provided is a terminal for receiving setting of a beam mode in a wireless communication system, comprising a transceiver unit configured to perform data communication with at least one network node; and a control unit configured to control receiving a beam mode setting message from a base station, to control setting one of a beam fixed mode or a beam sweeping mode, based on the received beam mode setting message, and to control performing data communication with the base station, based on the set mode.

Advantageous Effects of Invention

According to an embodiment of the present invention, it is possible to provide a method for effectively operating a beam mode in a wireless communication system.

According to an embodiment of the present invention, uplink overhead can be reduced and calculation complexity of a terminal can be reduced. Also, power consumption of the terminal can be reduced.

Additionally, according to an embodiment of the present invention, it is possible to improve flexibility in selecting a transmission beam ID of a base station.

MODE FOR THE INVENTION

Hereinafter, embodiments of the present invention will be described with reference to the accompanying drawings. In this disclosure, well known functions or structures may not be described or illustrated in detail to avoid obscuring the subject matter of the present invention. Additionally, the terms used herein are defined in view of functions in this invention and may be varied according to user or operator's intention or custom. Therefore, such a definition should be made on the basis of the contents of this disclosure.

Hereinafter, embodiments of the present invention will be described with regard to a method, together with a related procedure, in which a base station allocates a specific transmission or reception beam thereof to a terminal depending on a channel status when the base station and the terminal perform communication by using several beams in a wireless communication system.

Hereinafter, this invention will be described using, as an example, a wireless communication system of OFDM (Orthogonal Frequency Division Multiplexing)/OFDMA (Orthogonal Frequency Division Multiple Access) technique.

In embodiments of this invention, a beam mode may include a beam sweeping mode of failing to fixedly allocate a transmission or reception beam of a base station to a terminal, and a beam fixed mode of fixedly allocating the transmission or reception beam to the terminal.

Figure 1:
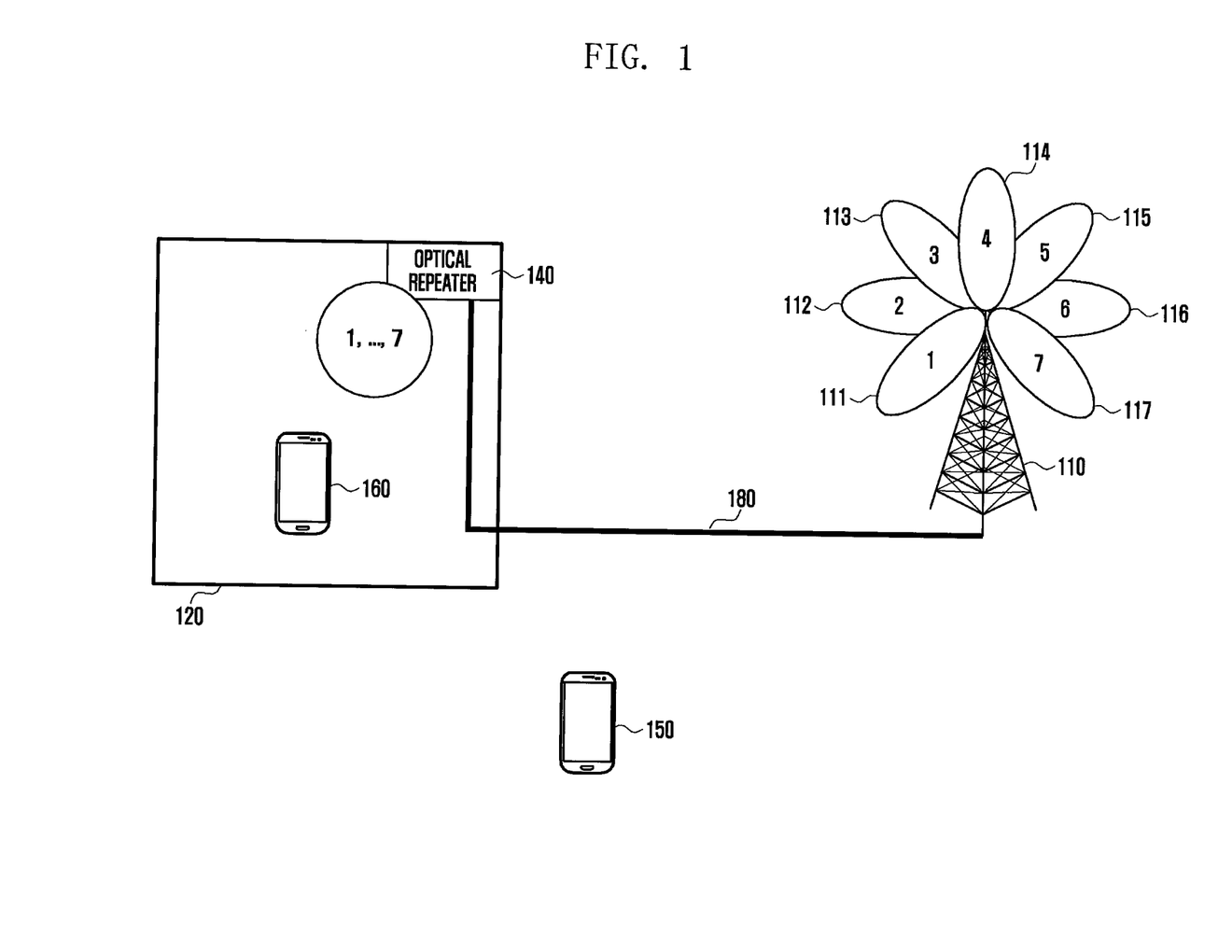
FIG. 1 is a diagram illustrating an example of using an optical repeater in a wireless communication system that operates a plurality of beams.

FIG. 1 is a diagram illustrating an example of using an optical repeater in a wireless communication system that operates a plurality of beams.

Referring to FIG. 1, a base station 110 operates seven beams in total. The base station 110 is connected to an optical repeater 140 in a building 120 by means of an optical cable. Therefore, even though the base station uses no beam among seven beams, all signals arrive at the optical repeater. The optical repeater uses one or more fixed beams without performing a beam sweeping. It is assumed in FIG. 1 that one fixed beam is used.

Referring to FIG. 1, it is assumed that a first terminal 150 located at the outside of the building receives signals from the base station 110 and the strength of a signal received from a first beam 111 is greater than the strength of a signal received from other beams 112-117. Using the first beam 111, the base station 110 may transmit may transmit data to the first terminal 150 and receive data from the first terminal 150. It is also assumed that a second terminal 160 is located in the building 120 and fails to directly receive a signal from the base station 110. Therefore, the second terminal 160 should receive a signal from the optical repeater 140 in the building 120. Contrary to the first terminal 150, the second terminal 160 experiences a channel having the same quality from the optical repeater 140 with regard to all beams 111-117 used by the base station 110. Since the terminal needs not to distinguish the repeater from the base station, even any case of receiving a signal from the repeater will be described hereinafter as receiving the signal from the base station.

If channel statuses of all transmission beams of the base station are similar to each other with regard to one reception beam of the terminal, or if channel statuses of all reception beams of the base station are similar to each other with regard to one transmission beam of the terminal, the base station can communicate with the terminal even though unchangeably using any single transmission beam and any single reception thereof.

Hereinafter, a process of examining a similarity of a channel status between base station beams will be described together with subsequent operation procedures of the base station and the terminal.

Figure 2:
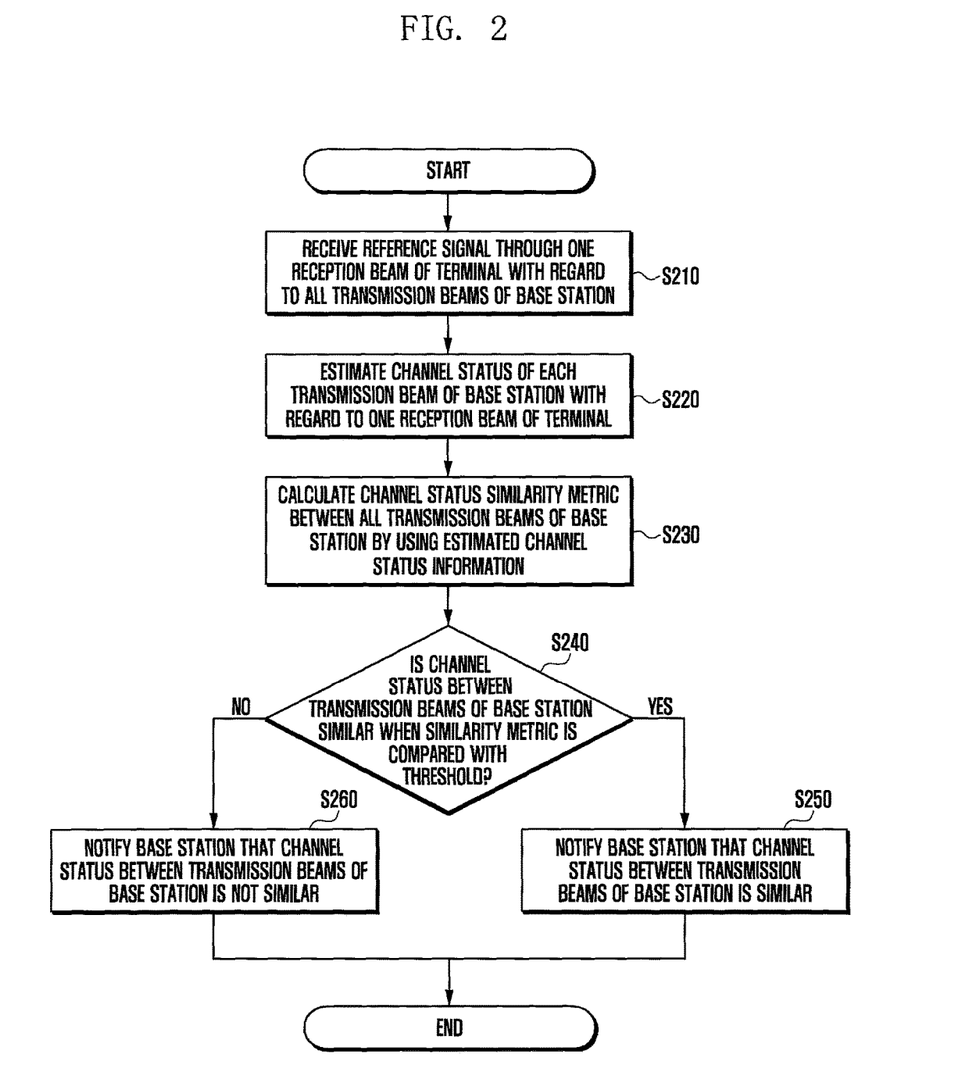
FIGS. 2, 3 and 4 are diagrams illustrating a process of, at a terminal, examining a similarity of a channel status between beams of a base station and then performing a subsequent procedure in a wireless communication system according to an embodiment of the present invention.
Figure 3:
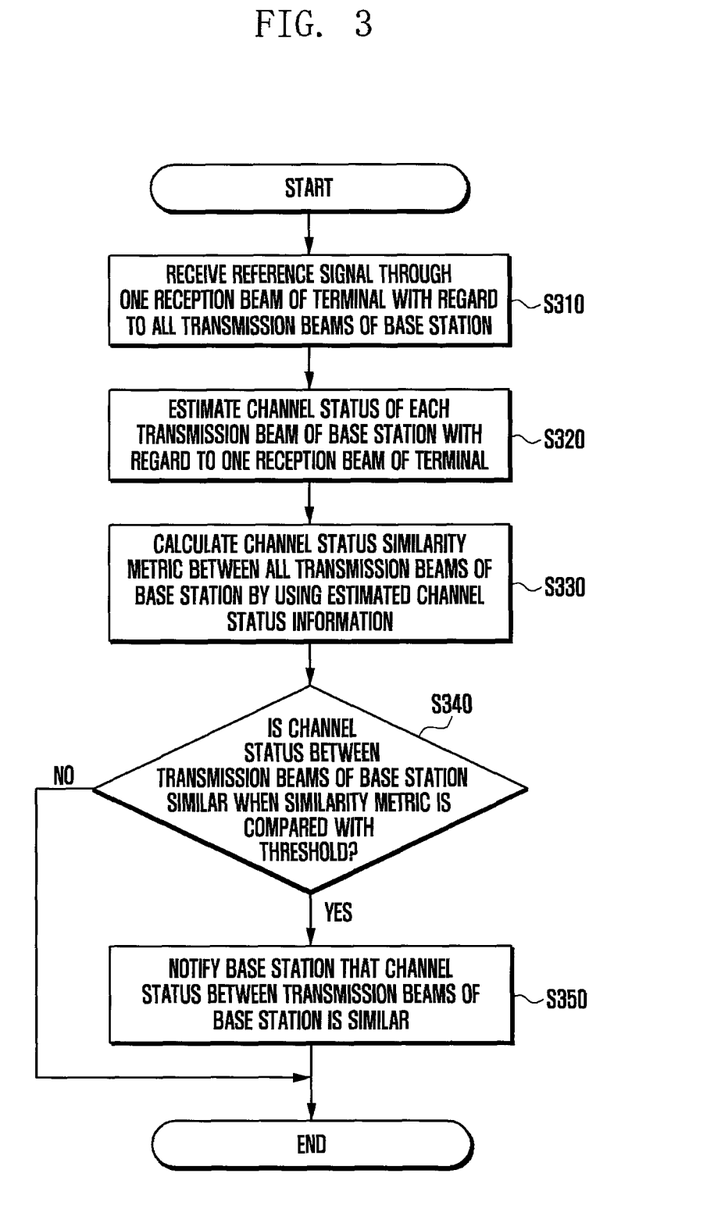
Figure 4:
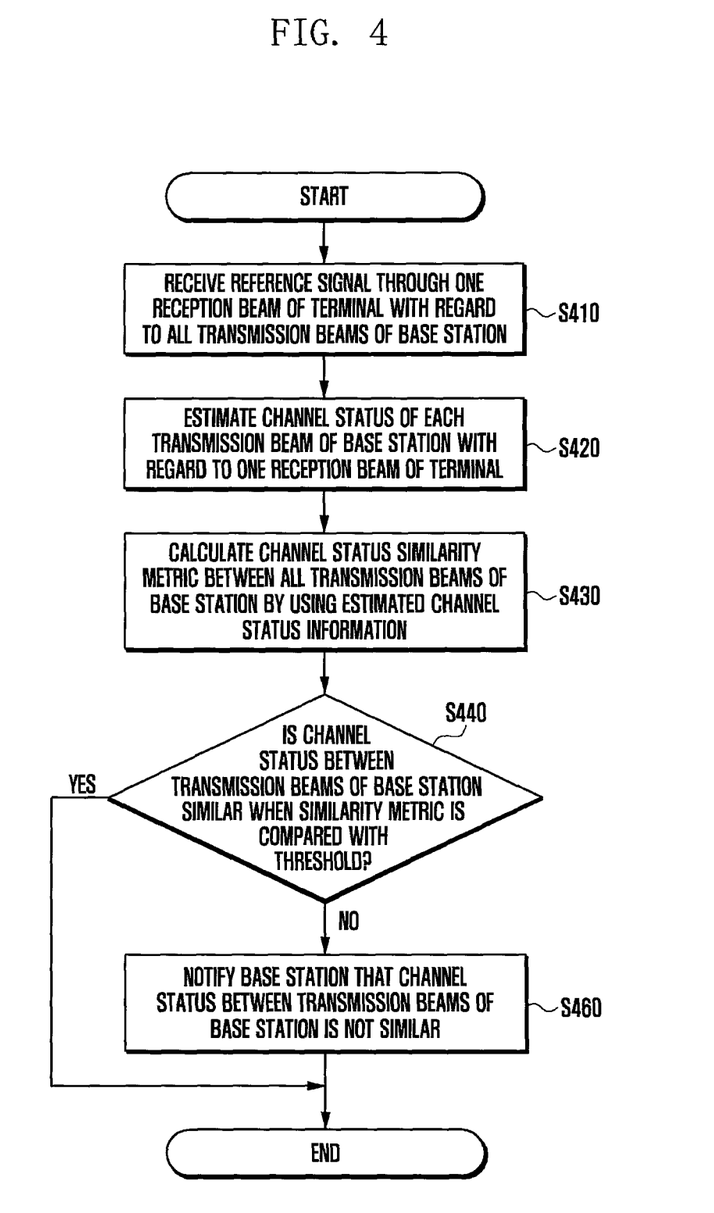

FIGS. 2, 3 and 4 are diagrams illustrating a process of, at a terminal, examining a similarity of a channel status between beams of a base station and then performing a subsequent procedure in a wireless communication system according to an embodiment of the present invention. Based on the following method, the terminal may measure a similarity metric value of base station transmission beams with regard to each reception beam of the terminal and then determine a similarity of the base station transmission beams by using the similarity metric value.

Referring to FIG. 2, at step S210, the terminal receives, through one reception beam, a reference signal with regard to all transmission beams transmitted by the base station. At step S220, the terminal estimates a channel status of each transmission beam of the base station with regard to one reception beam of the terminal. A value that represents a channel status with regard to a pair of transmission and reception beams includes SNR (Signal-to-Noise Ratio), SIR (Signal-to-Interference Ratio), SINR (Signal-to-Interference plus Noise Ratio), SLNR (Signal-to-Leakage plus Noise Ratio), RSSI (Reference Signal Strength Indicator), RSRQ (Reference Signal Received Quality), RSRP (Reference Signal Received Power), and the like. The above process may be performed at each reception beam of the terminal.

At step S230, the terminal calculates a similarity metric of a channel status between all transmission beams of the base station by using the estimated channel status information.

A method for calculating a similarity metric is as follows. The method for a similarity metric calculation proposed below may be used even in case of calculating a similarity metric in another embodiment of this invention. Although the method for a similarity metric calculation will be described using a downlink channel, the scope of the invention is not limited to this and the described method may be equally applied to uplink.

With regard to a specific reception beam of the terminal, let's suppose that Xi denotes a channel status (SNR, RSRP, RSRQ, RSSI, etc.) about the i-th transmission beam of the base station. If there are N transmission beams of the base station, an average value $\bar{x}$ of channel status values Xi (i=1, ..., N) about all transmission beams of the base station with regard to a specific reception beam of the terminal may be obtained as Equation 1.

$$\bar{X} = \frac{1}{N} \sum_{i=1}^{N} X_i \quad \text{(Equation 1)}$$

An average of squares of differences between a channel status value about each beam and the average thereof may be obtained as Equation 2.

$$Y = \frac{1}{N} \sum_{i=1}^{N} (X_i - \bar{X})^2 \quad \text{(Equation 2)}$$

If the value of Y obtained above is smaller than a predetermined threshold, it may be determined that channel statuses between transmission beams of the base station are similar to each other.

Another method for calculating a similarity metric of a channel status between all transmission beams of the base station is as follows. With regard to a specific reception beam of the terminal, let's suppose that Xi(k) denotes the k-th (k=1, . . . K) channel status (SNR, RSRP, RSRQ, RSSI, etc.) about the i-th transmission beam of the base station. Total K channel status samples may be obtained from the time or frequency axis. A correlation between the i-th transmission beam channel status and the j-th transmission beam channel status may be obtained as Equation 3.

$$\rho_{i,j} = \frac{\sum_{k=1}^{K}(X_i(k) - \overline{X}_i)(X_j(k) - \overline{X}_j)}{\sqrt{\sum_{k=1}^{K}(X_i(k) - \overline{X}_i)^2}\sqrt{\sum_{k=1}^{K}(X_j(k) - \overline{X}_j)^2}}$$ (Equation 3)

In Equation 3, $$\overline{X}_i = \frac{1}{K}\sum_{k=1}^{K}X_i(k) \text{ and } \overline{X}_j = \frac{1}{K}\sum_{k=1}^{K}X_j(k).$$

The correlation may be defined as any other well known technique being similar to Equation 3. If channel statuses between all transmission beams are similar to each other, the correlation of Equation 3 may have a great value with regard to all transmission beam pairs (i, j). If an average of correlations about all transmission beam pairs or parts thereof is greater than a predetermined threshold, it may be determined that channel statuses between base station transmission beams are similar to each other.

The similarity metric may be calculated using the above-discussed method. This method for similarity metric calculation is merely an example and does not limit the scope of the invention. The similarity metric may be calculated using any other method.

As discussed above, the terminal may calculate a similarity metric value of a transmission beam of the base station with regard to each reception beam and determine a similarity of the base station transmission beam by using several similarity metric values (e.g., average, maximum value, etc.).

After calculating the similarity metric at step S230, the terminal may compare the similarity metric with a predetermined threshold and thereby determine, at step S240, whether a channel status between transmission beams of the base station is similar with regard to a specific reception beam of the terminal. Referring to FIG. 2, if it is determined that a channel status is similar, the terminal may notify, at step S250, the base station that a channel status between transmission beams of the base station is similar. If it is determined that a channel status is not similar, the terminal may notify, at step S260, the base station that a channel status between transmission beams of the base station is not similar.

Referring to FIGS. 3 and 4, steps S310 to S330 of FIG. 3 are equivalent to steps S210 to S230 of FIG. 2. Also, steps S410 to S430 of FIG. 4 are equivalent to steps S210 to S230 of FIG. 2.

Referring to FIG. 3, at step S340, the terminal may compare the calculated similarity metric with a predetermined threshold and thereby determine whether a channel status between transmission beams of the base station is similar with regard to a specific reception beam of the terminal. If it is determined that a channel status is similar, the terminal may notify, at step S350, the base station that a channel status between transmission beams of the base station is similar. If it is determined that a channel status is not similar, the terminal may not notify anything to the base station.

Referring to FIG. 4, at step S440, the terminal may compare the calculated similarity metric with a predetermined threshold and thereby determine whether a channel status between transmission beams of the base station is similar with regard to a specific reception beam of the terminal. If it is determined that a channel status is similar, the terminal may not notify anything to the base station. If it is determined that a channel status is not similar, the terminal may notify, at step S460, the base station that a channel status between transmission beams of the base station is similar.

The procedure of the terminal for channel similarity metric calculation and base station notification discussed above with reference to FIGS. 2 to 4 may be performed in response to a related command from the base station or spontaneously by the terminal. In the former case, the above procedure may be performed once at a specific time or performed periodically. In this case, together with the command, the base station may directly or indirectly inform the terminal about uplink resources (time, frequency position, etc.) to be used when the terminal will notify whether a channel status is similar or not. In the latter case, the above procedure may be formed once at the occurrence of a specific event or performed periodically. When notifying whether a channel status is similar or not, the terminal may use a resource if there is a usable uplink resource. If there no usable uplink resource, the terminal should perform a procedure (scheduling request, bandwidth request, random access, etc.) of requesting an uplink resource from the base station. In case of performing the above procedure at the occurrence of a specific event, this event may include a remarkable variation in a path loss value, a remarkable variation in a moving speed of the terminal, or a remarkable variation in a channel status (delay spread quantity, multi-path number, the existence or not of line-of-sight (LOS) component or magnitude thereof).

Figure 5:
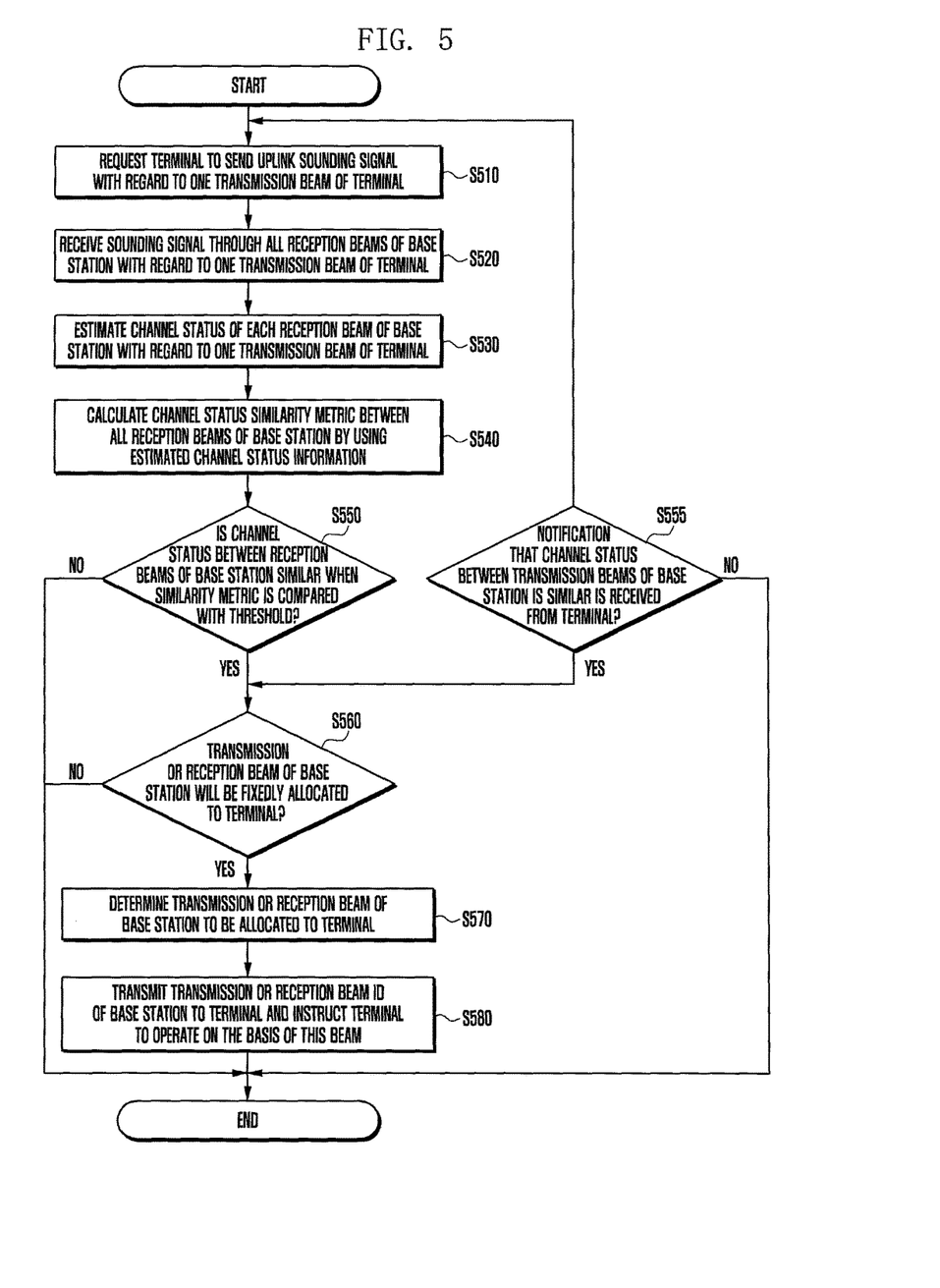
FIG. 5 is a diagram illustrating a process of, at a base station, setting a beam mode on the basis of a similarity examination of a channel status according to an embodiment of the present invention.

FIG. 5 is a diagram illustrating a process of, at a base station, setting a beam mode on the basis of a similarity examination of a channel status according to an embodiment of the present invention. Specifically, FIG. 5 shows a process in which the base station examine a similarity of channel statuses between beams thereof or receives an examination notification from the terminal and then performs a subsequent procedure in case of not fixedly allocating a transmission or reception beam of the base station to the terminal in the wireless communication system (in case of a beam sweeping mode). Based on the following description, the base station may calculate a similarity metric value of a reception beam thereof with regard to each transmission beam of the terminal and determine a similarity of a reception beam thereof by using several similarity metric values.

Referring to FIG. 5, at step S510, the base station requests the terminal to send an uplink sounding signal by using one transmission beam. At step S520, the base station may receive, through all reception beams, an uplink sounding signal transmitted by the terminal. After receiving the signal from the terminal, the base station may estimate a channel status of each beam thereof at step S530. At step S540, by using the estimated channel status information, the base station may calculate a similarity metric of channel statuses between all reception beams thereof with regard to a specific transmission beam of the terminal. This method for calculating a similarity metric of a channel status about reception beams of the base station may be similar to the method for calculating a similarity metric in FIGS. 2 to 4.

At step S550, the base station may compare the similarity metric with a predetermined threshold and thereby determine whether a channel status between beams thereof is similar. Namely, the base station may calculate a similarity metric value of a reception beam thereof with regard to each transmission beam of the terminal and determine a similarity of the reception beam by using several similarity metric values (average value, maximum value). A method for comparing the similarity metric with the predetermined threshold may be similar to the above method proposed in FIGS. 2 to 4. If it is determined that a channel between reception beams of the base station is similar, the base station may perform step S560.

Additionally, if the base station receives, from the terminal at step S555, a notification that a channel status between transmission beams of the base station is similar, the base station may perform step S560. If it is determined that a channel status is not similar, or if a notification of dissimilarity in channel status is received from the terminal, the base station may terminate a related procedure. At step S560, the base station may determine whether to fixedly allocating or not a transmission or reception beam thereof to the terminal. Namely, the base station may determine whether to set to operate in a beam sweeping mode or a beam fixed mode. If it is determined at step S560 to fixedly allocate a transmission or reception beam of the base station (namely, if the base station selects a beam fixed mode), the base station may perform step S570. If it is determined not to fixedly allocate a transmission or reception beam, the base station may terminate a related procedure. At step S570, the base station may determine a transmission or reception beam to be allocated to the terminal. Thereafter, at step S580, the base station may transmit ID about the determined transmission or reception beam thereof to the terminal, and instruct the terminal to perform a related operation on the basis of the determined transmission or reception beam. Namely, the base station and the terminal may perform communication using the transmission or reception beam determined by the base station. In such a beam fixed mode, until receiving additional instructions about a base station transmission beam ID or a base station reception beam ID contained in a control message, the terminal may perform operation on the premise that the base station always transmits a signal through a beam corresponding to a transmission beam ID contained in the control message and always receives a signal through a beam corresponding to a reception beam ID contained in the control message.

Figure 6:
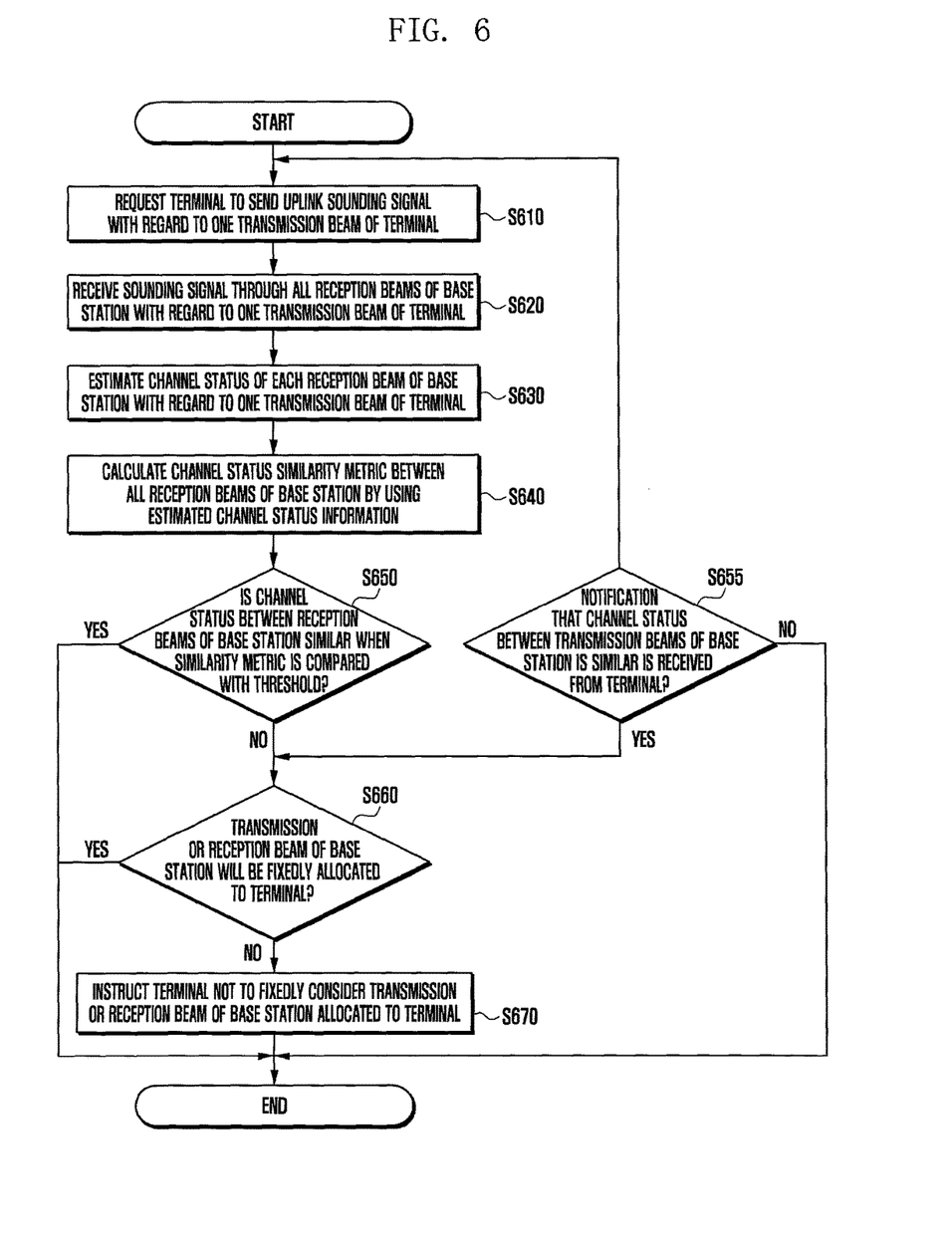
FIG. 6 is a diagram illustrating a process of, at a base station, setting a beam mode on the basis of a channel status similarity when a transmission beam and a reception beam of a base station are fixedly allocated to a terminal in a wireless communication system according to an embodiment of the present invention.

FIG. 6 is a diagram illustrating a process of, at a base station, setting a beam mode on the basis of a channel status similarity when a transmission beam and a reception beam of a base station are fixedly allocated to a terminal in a wireless communication system according to an embodiment of the present invention. Specifically, FIG. 6 shows a process in which the base station examine a similarity of channel statuses between beams thereof or receives an examination notification from the terminal and then performs a subsequent procedure in case of fixedly allocating a transmission or reception beam of the base station to the terminal in the wireless communication system (in case of a beam fixed mode).

Referring to FIG. 6, at step S610, the base station requests the terminal to send an uplink sounding signal by using one transmission beam. At step S620, the base station may receive, through all reception beams thereof, an uplink sounding signal transmitted by the terminal. After receiving the signal from the terminal, the base station may estimate a channel status of each beam thereof at step S630. At step S640, by using the estimated channel status information, the base station may calculate a similarity metric of channel statuses between all reception beams thereof with regard to a specific transmission beam of the terminal. This method for calculating a similarity metric of a channel status about reception beams of the base station may be similar to the method for calculating a similarity metric in FIGS. 2 to 4.

At step S650, the base station may compare the similarity metric with a predetermined threshold and thereby determine whether a channel status between beams thereof is similar. Namely, the base station may determine whether to set to operate in a beam sweeping mode or a beam fixed mode. If it is determined that a channel between reception beams of the base station is not similar, or if a notification that a channel status between transmission beams of the base station is not similar is received from the terminal at step S655, the base station may determine at step S660 whether to fixedly allocating or not a transmission or reception beam thereof to the terminal. If it is determined not to fixedly allocate a beam of the base station, the base station may inform the terminal of no need to operate with a fixed beam at step S670. In such a beam sweeping mode, a control message does not contain a base station transmission beam ID or a base station reception beam ID. Also, the terminal may perform operation on the premise that the base station may transmit a signal through any transmission beam and receive a signal through any reception beam.

If the base station determines at step S560 that a channel status about each beam is similar, or if the base station receives from the terminal a notification that a channel status about each beam of the base station is similar, the base station may terminal a procedure since a communication quality is not affected by a continuous use of currently allocated fixed transmission and reception beams. However, this is not considered as a limitation and may vary according to setting.

In FIGS. 5 and 6, a moving speed of the terminal or a variation speed of a channel may be considered to determine whether to fixedly allocate a transmission or reception beam of the base station to the terminal.

Additionally, a balance of the number of allocated users between beams may be considered in determining a transmission or reception beam of the base station to be allocated to the terminal, and allocation to a specific beam may be considered for easiness of resource scheduling.

Figure 7:
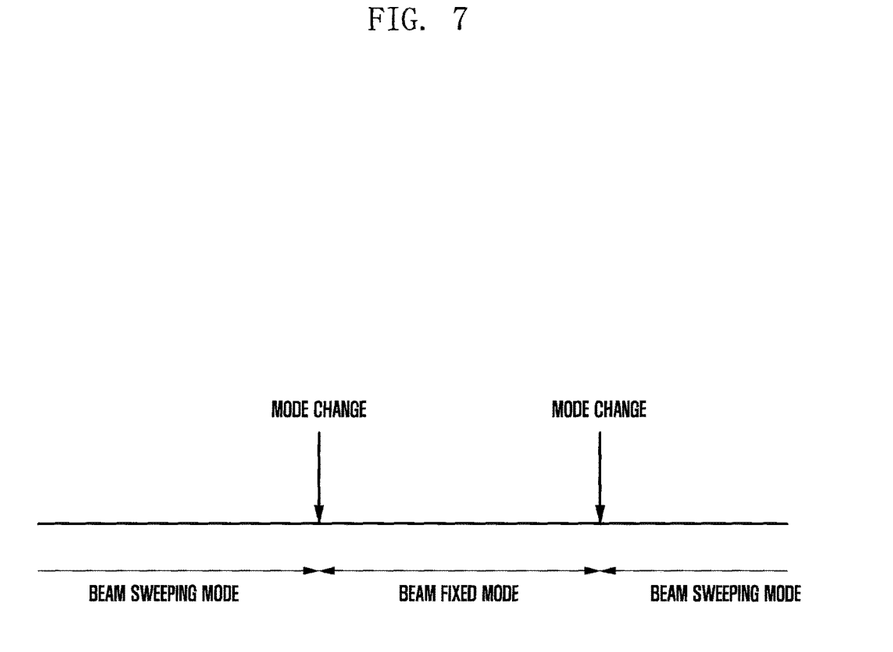
FIG. 7 is a diagram illustrating a process of operating a beam sweeping mode and a beam fixed mode in a wireless communication system according to an embodiment of the present invention.

FIG. 7 is a diagram illustrating a process of operating a beam sweeping mode and a beam fixed mode in a wireless communication system according to an embodiment of the present invention.

Referring to FIG. 7, the terminal may operate in a beam sweeping mode or a beam fixed mode.

In explaining characteristics of the beam sweeping mode, the base station may set a beam ID feedback cycle of the terminal according to environments of the terminal in the beam sweeping mode. The terminal may transmit an optimal beam ID to the base station at every beam ID feedback cycle. The base station may transmit PDCCH by using an optimal transmission beam based on the optimal beam ID received from the terminal. The terminal that receives downlink from the base station finds, stores, and updates an optimal reception beam with regard to every transmission beam operated by the base station. Using the found optimal reception beam, the terminal may receive downlink. The terminal may calculate CQI, RMI and RI with regard to respective transmission beams of the base station and also calculate averages thereof. In case of a failure in radio link between the base station and the terminal, the terminal may tries a connection through a random access. The terminal may transmit a random access channel (RAHC) preamble for all pairs of transmission and reception beams of the terminal and the base station. In uplink, the base station may allocate a resource to the terminal so as to receive a sounding signal through all reception beams.

In explaining characteristics of the beam fixed mode, the base station may set a very longer beam ID feedback cycle of the terminal in the beam fixed mode. Therefore, uplink overhead may be reduced.

The base station may inform the terminal of a transmission beam ID to be used for downlink transmission. At this time, the terminal may receive a channel on the assumption that PDCCH will be transmitted through a beam informed by the base station. Also, even though there is no transmission beam information about PDSCH in PDCCH, the terminal may receive a channel on the assumption that PDSCH will be transmitted through a transmission beam of the base station that transmits the PDCCH. Therefore, a calculation complexity of the terminal may be reduced, and the base station may have flexibility in selecting a transmission beam to be used for the terminal.

An optimal reception beam of the terminal is determined regardless of a transmission beam of the base station. Therefore, the terminal finds an optimal beam with regard to only one transmission beam. Also, the terminal may calculate CQI/PMI/RI with regard to any single beam of transmission beams of the base station or only a beam informed by the base station. Therefore, a calculation complexity of the terminal may be reduced.

When the terminal is in a connected mode, the base station may inform the terminal of a reception beam ID to be used for the terminal. In case of a failure in radio link, the terminal may tries a random access by transmitting a random access channel (RAHC) preamble to only a section corresponding to a reception beam ID received from the base station. Through this, power consumption of the terminal may be reduced. Also, the base station may allocate a resource to the terminal to receive a sounding signal through only one reception beam. Therefore, uplink overhead may be reduced.

In FIG. 7, if the terminal receives from the base station a message for a mode change in a beam sweeping mode, the terminal may change a mode state to a beam fixed mode. The base station may estimate a channel status of each reception beam thereof and measure a channel status similarity metric between all reception beams thereof by using the estimated channel status information. If it is determined on the basis of calculation results that a channel status between all reception beams of the base station is similar, or if a notification that a channel status between transmission beams of the base station is similar is received from the terminal, the base station may instruct the terminal to change to a beam fixed mode.

Additionally, if the terminal receives from the base station a message for a mode change in a beam fixed mode, the terminal may change a mode state to a beam sweeping mode. The base station may estimate a channel status of each reception beam thereof and measure a channel status similarity metric between all reception beams thereof by using the estimated channel status information. If it is determined on the basis of calculation results that a channel status between all reception beams of the base station is not similar, or if a notification that a channel status between transmission beams of the base station is not similar is received from the terminal, the base station may instruct the terminal to change to a beam sweeping mode.

Hereinafter, detailed operations and procedures of the base station and the terminal when the base station allocates a specific transmission or reception beam to the terminal will be described.

Based on a similarity metric calculated by the base station, the base station may determine whether a channel status between reception beams thereof is similar, or determine whether a channel status between transmission beams thereof is similar. Since such determination process and method are discussed above, a detailed description will be omitted. If it is determined that a channel status of base station beams is similar, the base station may perform the following operation.

In a beamforming system, the base station may set a feedback cycle about a downlink base station transmission beam ID of the terminal depending on environments (moving speed, channel variation speed, etc.) of the terminal. As discussed above in FIGS. 1 to 7, the base station allocates a specific transmission or reception beam to the terminal (i.e., sets a fixed mode) when a transmission or reception beam thereof is similar. Therefore, the base station may set a very longer beam ID feedback cycle of the terminal or stop a beam ID feedback until a new instruction is issued. Through this, overhead of uplink resource is reduced advantageously.

When allocating a downlink resource (time, frequency) to the terminal, the base station informs location information about the resource and an ID of a downlink transmission beam through which the base station will transmit a signal by using the resource. This allows the terminal to receive a signal through the most suitable (or having the most performance) reception beam for the base station transmission ID.

As discussed above in an embodiment of this invention, the base station allocates a specific transmission or reception beam to the terminal when a transmission or reception beam thereof is similar. Therefore, since the same reception beam is used by the terminal even though the base station selects any transmission beam, there is need to inform a base station transmission beam ID to be used for signal transmission using a resource when informing resource allocation information through PDCCH (Physical Downlink Control Channel). It is therefore to reduce information bit size contained in PDCCH. Also, using PDCCH of a reduced size may cause a reduction in overhead of a downlink control channel. Depending on beamforming system designs, there may be a need to know a base station transmission beam ID even in the above case when the terminal receives a signal from the base station.

If PDCCH is designed with a blind decoding type using a search space, and if the terminal is required to use specific mapping between the search space and a base station transmission beam ID, the terminal should know the base station transmission beam ID. However, according to the above method proposed in an embodiment of this invention, even though the base station transmission beam ID is not contained in PDCCH, the terminal may perform operations on the assumption that the base station will transmit a signal through a transmission beam corresponding to the base station transmission beam ID allocated by the base station.

Normally the terminal finds an optimal beam pair by estimating and comparing channel statuses with regard to all pairs of a base station transmission beam and a terminal reception beam. According to an embodiment of this invention, since the base station allocates a specific transmission or reception beam to the terminal (i.e., sets a fixed mode) when a transmission or reception beam thereof is similar, the optimal reception beam of the terminal may be equal with regard to any transmission beam of the base station. Therefore, the terminal may reduce calculation complexity and power consumption by performing only a channel estimation of each reception beam with regard to any single transmission beam or a transmission beam allocated by the base station.

According to the above-discussed embodiment of this invention, the terminal may measure information such as CQI (Channel Quality Indication), PMI (Precoding Matrix Indication), RI (Rank Indication), or the like by using only one transmission beam of the base station.

Normally the base station send a request by allocating an uplink resource so as to receive an uplink sounding reference signal of the terminal through all or parts of reception beams thereof. According to an embodiment of this invention, since the base station allocates a specific transmission or reception beam to the terminal when a transmission or reception beam thereof is similar, the optimal reception beam of the terminal may be equal even though the base station estimates an uplink channel of the terminal with regard to any reception beam. Therefore, the base station may allocate a resource to receive the sounding reference signal through only one reception beam and thereby reduce uplink overhead.

Normally after disconnection (radio link failure (RLF)) with the base station in the beamforming system, reconnection requires to transmit a random access preamble with regard to all pairs of a terminal transmission beam and a base station reception beam. According to an embodiment of this invention, since the base station allocates a specific transmission or reception beam to the terminal when a transmission or reception beam thereof is similar, the terminal may send a preamble with regard to any single reception beam of the base station or only a reception beam allocated by the base station if resources to be used for a random access are divided according to reception beams of the base station. Therefore, uplink overhead is reduced and power consumption of the terminal is also reduced.

According to an embodiment of the present invention, it is possible to change, if necessary, a base station transmission or reception beam allocated to the terminal by the base station and then notify again it to the terminal.

Figure 8:
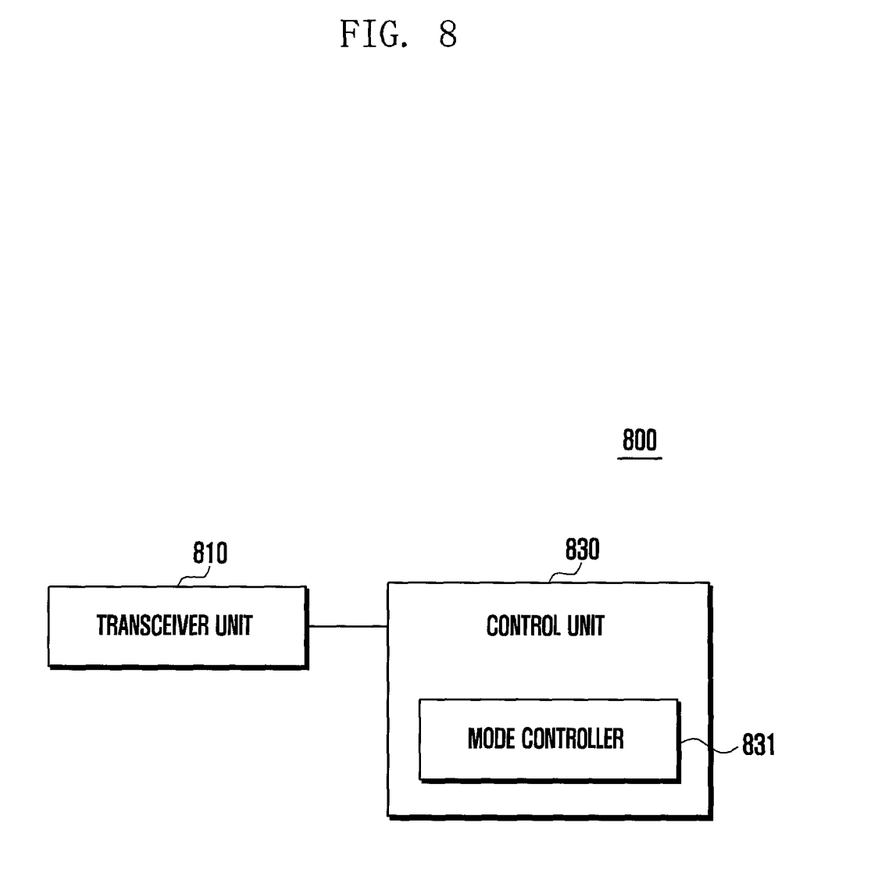
FIG. 8 is a block diagram illustrating a base station according to an embodiment of the present invention.

FIG. 8 is a block diagram illustrating a base station according to an embodiment of the present invention.

Referring to FIG. 8, the base station 800 according to an embodiment of this invention may include a transceiver unit 810 and a control unit 830. The transceiver unit 810 may perform data communication with neighboring network nodes. The control unit 830 may control the overall operation of the base station 800.

The transceiver unit 810 may perform data communication with at least one network node in a mobile communication system. According to an embodiment of this invention, the transceiver unit 810 may transmit a control message containing beam mode information to at least one terminal. Also, channel status information about a transmission beam of the base station 800 may be received from at least one terminal. And also, using transmission and reception beams selected by the base station 800, communication may be performed with at least one terminal.

According to an embodiment of this invention, the control unit 830 may include a mode selection controller 831. The mode selection controller 831 may control selecting a beam mode for at least one terminal serviced by the base station on the basis of a channel status of a transmission beam or a reception beam of the base station, transmitting a control message containing information about the selected beam mode to the terminal, and performing data communication with the terminal by using a transmission beam and a reception beam corresponding to the selected mode. The beam mode may include a beam sweeping mode of failing to fixedly allocate the transmission or reception beam of the base station to the terminal, and a beam fixed mode of fixedly allocating the transmission or reception beam to the terminal.

Additionally, the mode selection controller 831 may control estimating a channel status of all reception beams of the base station with regard to each transmission beam transmitted by the terminal, determining a channel status similarity with regard to difference reception beams of the base station, and selecting a beam fixed mode as the beam mode if it is determined that the channel status is similar.

Additionally, the mode selection controller 831 may control receiving information about a channel status similarity with regard to different transmission beams of the base station from the terminal, and based on the received information, selecting a beam fixed mode as the beam mode if the channel status is similar. If it is determined that the channel status is not similar, the mode selection controller 831 may control selecting a beam sweeping mode as the beam mode.

The control message transmitted under the control of the mode selection controller 831 may include beam mode setting information for setting any transmission beam as a transmission beam of the base station when the mode selected by the base station is a beam fixed mode, and include beam mode setting information for setting a transmission beam corresponding to an optimal transmission beam ID transmitted by the terminal as a transmission beam of the base station when the mode selected by the base station is a beam sweeping mode.

Although elements and operations of the base station 800 are described above in the unit of blocks, this is exemplary only and not to be considered as a limitation. Also, the transceiver unit 810 and the control unit 830 of the base station may perform respective operations discussed above in FIGS. 1 to 7 according to an embodiment of this invention.

Figure 9:
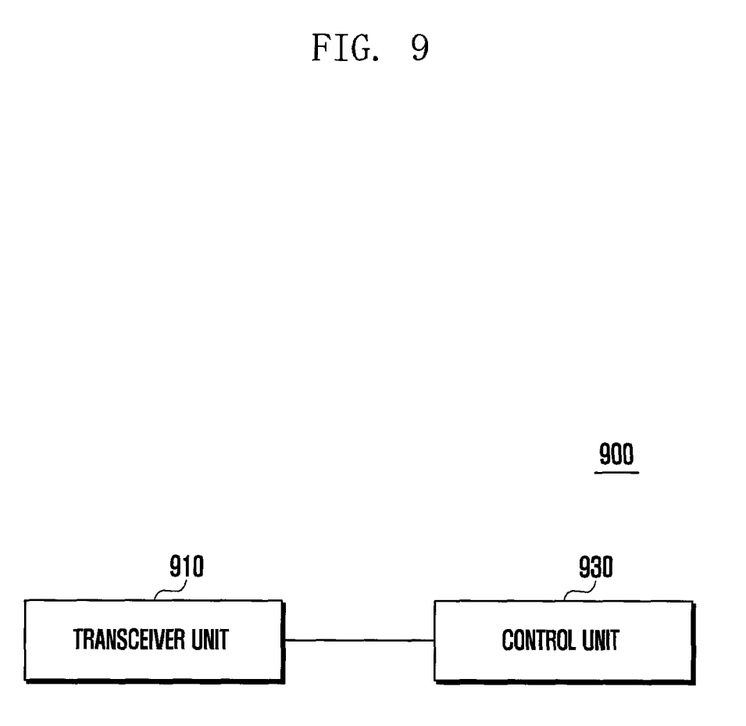
FIG. 9 is a block diagram illustrating a terminal according to an embodiment of the present invention.

FIG. 9 is a block diagram illustrating a terminal according to an embodiment of the present invention.

Referring to FIG. 9, the terminal 900 according to an embodiment of this invention may include a transceiver unit 910 and a control unit 930. The transceiver unit 910 may perform data communication with neighboring network nodes. The control unit 930 may control the overall operation of the terminal 900.

The transceiver unit 910 may perform data communication with at least one network node. According to an embodiment of this invention, the transceiver unit 910 may receive a control message containing beam mode information from the base station. Also, channel status information of each transmission beam of the base station with regard to a reception beam of the terminal may be delivered to the base station. And also, using transmission and reception beams selected by the base station, data communication may be performed with the base station.

According to an embodiment of this invention, the control unit 930 may control receiving a beam mode setting message from the base station, setting one of a beam fixed mode and a beam sweeping mode on the basis of the received beam mode setting message, and performing data communication with the base station on the basis of the set mode.

Additionally, according to an embodiment of this invention, the control unit 930 may control transmitting channel status information of each transmission beam of the base station with regard to one reception beam of the terminal to the base station. The beam mode setting message may correspond to the channel status information transmitted by the terminal.

Additionally, according to an embodiment of this invention, the control unit 930 may control estimating a channel status of each transmission beam of the base station with regard to one reception beam of the terminal, determining a channel status similarity between all transmission beams of the base station by using the estimated channel status information, and transmitting the channel status information containing a result of determining the channel status similarity to the base station.

Additionally, the beam mode setting message received under the control of the control unit 930 may correspond to the channel status similarity between all reception beams of the base station with regard to one transmission beam of the terminal.

Although elements and operations of the base station 900 are described above in the unit of blocks, this is exemplary only and not to be considered as a limitation. Also, the transceiver unit 910 and the control unit 930 of the terminal may perform respective operations discussed above in FIGS. 1 to 7 according to an embodiment of this invention.

While this invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A method by a base station in a wireless communication system, the method comprising:
 receiving an uplink sounding reference radio signal from a terminal through at least two beams of the base station;
 estimating a channel state of at least two beams of the base station based on the uplink sounding reference radio signal;
 identifying channel state information based on the channel state of the at least two beams and a threshold value;
 selecting a beam mode for the terminal, based on the channel state information;
 transmitting a control message including information about the selected beam mode to the terminal; and
 transmitting data to the terminal based on the selected beam mode.

2. The method of claim 1, wherein the beam mode includes a beam sweeping mode of flexibly allocating a transmission beam or a reception beam of the base station to the terminal, and a beam fixed mode of fixedly allocating the transmission beam or the reception beam of the base station to the terminal.

3. The method of claim 1, wherein the selecting the beam mode includes:
 selecting a beam fixed mode as the beam mode when it is determined that the channel state information indicating a similar channel state.

4. The method of claim 1, the method further comprising:
 receiving information about a channel state similarity of the at least two beams of the base station from the terminal; and
 based on the received information, selecting a beam fixed mode as the beam mode when the channel state similarity indicates a similar channel state.

5. The method of claim 3, wherein the selecting the beam mode includes:
 when it is determined that the channel state information indicates non similar channel state, selecting a beam sweeping mode as the beam mode.

6. The method of claim 1, wherein the control message includes:
 beam mode setting information for setting any transmission beam or any reception beam of the base station as a fixed transmission beam or a fixed reception beam of the base station for the terminal when the beam mode selected by the base station is a beam fixed mode, and
 beam mode setting information for not fixedly setting a transmission beam or a reception beam of the base station for the terminal when the beam mode selected by the base station is a beam sweeping mode.

7. A method by a terminal in a wireless communication system, the method comprising:
 transmitting an uplink sounding reference radio signal to a base station;
 receiving a beam mode setting message from the base station;
 setting one of a beam fixed mode or a beam sweeping mode, based on the received beam mode setting message; and
 receiving data from the base station, based on the set beam mode,
 wherein the uplink sounding reference radio signal is used by the base station for estimating a channel state of at least two beams of the base station, and
 wherein the beam mode is selected based on channel state information according to the channel state of at least two beams and a threshold value.

8. The method of claim 7, further comprising:
 transmitting a channel state value of each transmission beam of the base station for the terminal to the base station,
 wherein the beam mode setting message corresponds to the channel state value.

9. The method of claim 8, wherein the transmitting the channel state value to the base station includes:
 estimating a channel state of each transmission beam of the base station;
 determining a channel state similarity between all transmission beams of the base station based on the estimated channel state; and
 transmitting the channel state value including the channel state similarity.

10. The method of claim 7, wherein the beam mode is beam fixed mode when it is determined that the channel state information indicating a similar channel state.

11. A base station in a wireless communication system, the base station comprising:
a transceiver configured to transmit and receive a signal; and
a controller configured to:
receive an uplink sounding reference radio signal from a terminal through at least two beams of the base station,
estimate a channel state of at least two beams of the base station based on the uplink sounding reference radio signal,
identify channel state information based on the channel state of the at least two beams and a threshold value,
select a beam mode for the terminal, based on the channel state information,
transmit a control message including information about the selected beam mode to the terminal, and
transmit data to the terminal based on the selected beam mode.

12. The base station of claim 11, wherein the beam mode includes a beam sweeping mode of flexibly allocating a transmission beam or a reception beam of the base station to the terminal, and a beam fixed mode of fixedly allocating the transmission beam or the reception beam of the base station to the terminal.

13. The base station of claim 11, wherein the controller is further configured to:
select a beam fixed mode as the beam mode when it is determined that the channel state information indicates a similar channel state.

14. The base station of claim 11, wherein the controller is further configured to:
receive information about a channel state similarity of the at least two beams of the base station from the terminal, and
based on the received information, select a beam fixed mode as the beam mode when the channel state similarity indicates a similar channel state.

15. The base station of claim 13, wherein the controller is further configured to:
when it is determined that the channel state information indicates a non similar channel state, select a beam sweeping mode as the beam mode.

16. The base station of claim 11, wherein the control message includes:
beam mode setting information for setting any transmission beam or any reception beam of the base station as a fixed transmission beam or a fixed reception beam of the base station for the terminal when the beam mode selected by the base station is a beam fixed mode, and
beam mode setting information for not fixedly setting a transmission beam or a reception beam of the base station for the terminal when the beam mode selected by the base station is a beam sweeping mode.

17. A terminal in a wireless communication system, the terminal comprising:
a transceiver configured to transmit and receive a signal; and
a controller configured to:
transmit an uplink sounding reference radio signal to a base station,
receive a beam mode setting message from the base station,
set one of a beam fixed mode or a beam sweeping mode, based on the received beam mode setting message, and
receive data from the base station, based on the set beam mode,
wherein the uplink sounding reference radio signal is used by the base station for estimating a channel state of at least two beams of the base station, and
wherein the beam mode is selected based on channel state information according to the channel state of at least two beams and a threshold value.

18. The terminal of claim 17, wherein the controller is further configured to:
transmit a channel state value of each transmission beam of the base station for the terminal to the base station,
wherein the beam mode setting message corresponds to the channel state value.

19. The terminal of claim 18, wherein the controller is further configured to:
estimate a channel state of each transmission beam of the base station,
determine a channel state similarity between all transmission beams of the base station based on the estimated channel state, and
transmit a channel state value including the channel state similarity.

20. The terminal of claim 17, wherein the beam mode is beam fixed mode when it is determined that the channel state information indicates a similar channel state.

* * * * *